United States Patent
Naccache

(10) Patent No.: US 8,074,888 B2
(45) Date of Patent: Dec. 13, 2011

(54) TERMINAL, METHOD OF CHECKING CONFORMITY OF AT LEAST ONE REMOVABLE BATTERY OF AN ELECTRONIC PAYMENT TERMINAL, AND THE CORRESPONDING REMOVABLE BATTERY AND COMPUTER PROGRAM PRODUCT

(75) Inventor: David Naccache, Paris (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 48 days.

(21) Appl. No.: 12/399,539

(22) Filed: Mar. 6, 2009

(65) Prior Publication Data

US 2009/0230180 A1    Sep. 17, 2009

(30) Foreign Application Priority Data

Mar. 7, 2008    (FR) ...................... 08 51506

(51) Int. Cl.
*G06K 7/10* (2006.01)
*G06K 19/00* (2006.01)
*H02J 7/00* (2006.01)
*H02J 7/04* (2006.01)
*H02J 7/16* (2006.01)

(52) U.S. Cl. .................. 235/472.02; 320/106; 320/112; 320/132; 320/134; 320/136; 320/150; 320/162; 320/165; 340/5.8

(58) Field of Classification Search ............. 235/472.02; 340/5.8; 320/106, 112, 132, 150, 162, 165, 320/134, 136
See application file for complete search history.

(56) References Cited

U.S. PATENT DOCUMENTS

| | | | |
|---|---|---|---|
| 6,456,036 B1 * | 9/2002 | Thandiwe | 320/106 |
| 2003/0102842 A1 * | 6/2003 | Tamai et al. | 320/106 |
| 2006/0178170 A1 * | 8/2006 | Chung et al. | 455/572 |
| 2007/0072014 A1 * | 3/2007 | Kim et al. | 429/7 |
| 2007/0123304 A1 | 5/2007 | Pattenden et al. | |
| 2007/0188131 A1 * | 8/2007 | Guthrie | 320/112 |
| 2008/0024268 A1 * | 1/2008 | Wong et al. | 340/5.8 |
| 2008/0252477 A1 * | 10/2008 | Howard | 340/693.1 |

FOREIGN PATENT DOCUMENTS

| | | | |
|---|---|---|---|
| KR | 2007025337 | * | 3/2007 |
| WO | 00/79771 A1 | | 12/2000 |

OTHER PUBLICATIONS

French Search Report of Foreign Counterpart Application No. FR0851506, filed on Mar. 7, 2008.

* cited by examiner

*Primary Examiner* — Michael G Lee
*Assistant Examiner* — Laura Gudorf
(74) *Attorney, Agent, or Firm* — David D. Brush; Westman, Champlin & Kelly, P.A.

(57) ABSTRACT

A portable electronic payment terminal is provided, which includes at least one removable battery. The removable battery carries an electronic chip containing at least one item of identification information and is able to communicate with a contactless reading device present in the terminal. The terminal further includes: a transmitter for transmitting the identification information to a distant control server of the terminal manufacturer; and a receiver for receiving from the server conformity or non-conformity information according to whether the identification information belongs to a list approved by the manufacturer.

9 Claims, 2 Drawing Sheets

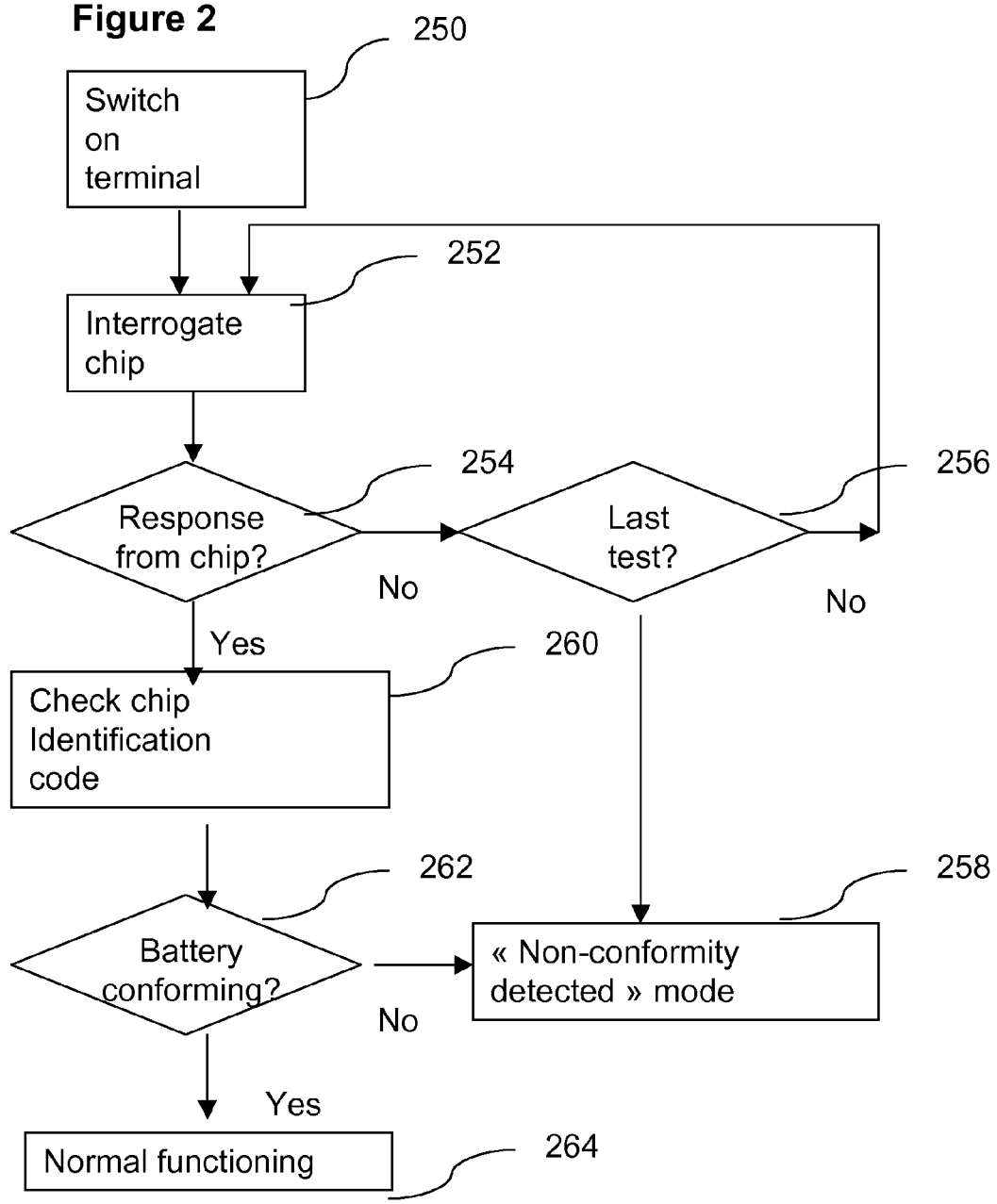

TERMINAL, METHOD OF CHECKING CONFORMITY OF AT LEAST ONE REMOVABLE BATTERY OF AN ELECTRONIC PAYMENT TERMINAL, AND THE CORRESPONDING REMOVABLE BATTERY AND COMPUTER PROGRAM PRODUCT

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of electronic payment terminals and in particular portable or mobile payment terminals.

Such terminals are generally equipped with removable batteries. These batteries may deteriorate over time, making it necessary to replace them.

It is important for the replacement batteries to be in conformity with the instructions of the manufacturer or supplier of the terminal, for safety, efficacy, reliability and guarantee reasons. For example, the use of a non-conforming battery may damage the terminal or impair its correct functioning. This aspect may be crucial, in particular in the context of bank transactions. A non-conforming battery is also generally less effective than the so-called original batteries.

The disclosure concerns more particularly checking the conformity of removable batteries, in electronic payment terminals.

BACKGROUND OF THE DISCLOSURE

Replacing a battery in an electronic terminal does not require the terminal to be dismantled, because of the removable character of this equipment, and can therefore be carried out simply by the users of the terminal, outside of the control of its manufacturer.

In addition, the use of electronic terminals being very widespread, non-conforming batteries may appear.

Batteries are familiar equipment for a user. Because of this, the user has the impression of knowing them well, and may be mistaken as to its origin and conformity.

This is because the shape of a battery, the compatibility of its interface and the electronic capacities mentioned are often the only visible characteristics for a user. When he wishes to procure a new battery to replace the defective battery of his mobile terminal, he may be confronted with a choice of products, sometimes at very different prices. The criterion for choice is often the price since, whatever the product, the user often thinks that he is acquiring a suitable product, similar to his original battery, in terms of quality.

However, as indicated above, the quality level of these replacement batteries is not generally the same as that of the original batteries.

For example, the charging time, the discharge cycle or the battery autonomy may be different. Likewise, the characteristics of the battery (voltage, current, impedance etc.) may be poor, or insufficiently stable. More seriously, the reliability of some batteries may be insufficient, thus incurring a risk to the integrity of the transactions carried out on a terminal equipped with such a battery.

These problems may prove to be particularly crucial in the case of electronic payment terminals.

SUMMARY

An aspect of the disclosure relates to a portable electronic payment terminal, comprising at least one removable battery, said removable battery carrying an electronic chip containing at least one item of identification information and being able to communicate with contactless reading means (a contactless reader) present in said terminal.

According to an aspect of the disclosure, such a terminal comprises:
  means for transmitting (e.g., a transmitter) said identification information to a distant control server of the manufacturer of the terminal,
  means for receiving (e.g., a receiver), from said server, conformity or non-conformity information depending on whether said identification information belongs to a list approved by said manufacturer.

The expression "contactless reading means" here designates any remote reader without a cable connection, for example a radio-frequency link.

The solution according to an aspect of the disclosure thus makes it possible to prevent the use of a non-conforming battery, which might reduce the reliability of the terminal, which is not compatible with the sensitive character of the type of transaction involved. Conformity is however not decided once and for all (for example by entering acceptable references at the time of manufacture of the terminal). On the contrary, conformity is checked with a server, which can be updated regularly.

Thus it is possible to declare conforming batteries whose references did not exist at the time of manufacture of the terminal, for example because they involve a new technology (the conformity of which has been tested with respect to the terminal) and/or because they are manufactured by a new supplier. This approach also makes it possible to declare non-conforming previously accepted batteries, for example because a fault or risk has been identified.

The approach of an aspect of the disclosure also makes it possible, in certain embodiments, to check expiry dates, preventing the use of batteries whose expiry date has passed.

The behaviour of the terminal when a non-conforming battery is detected may differ according to the embodiment of the disclosure.

Thus, in some embodiments, the terminal comprises means of blocking at least some functions of said terminal and/or generating at least one alarm according to at least one item of non-conformity information received from said server, such as through instructions executed by the microprocessor.

In a particular embodiment, said terminal may be completely blocked, making use thereof impossible, where applicable after a certain period of time during which particular operations can be performed.

In another particular embodiment (compatible with the previous one), said terminal may emit an alert message. The alert message may be generated in various ways, for example by means of a display, a print-outs, a voice synthesis mechanism, or the sending of a telephone or SMS message. The alert may be intended for the user or the owner of said terminal. It may also be generated to a third party, for example to the manufacturer of said terminal, in order to warn him of the possibility of counterfeiting.

According to an advantageous embodiment, said contactless reading means are activated according to at least one of the interrogation modes belonging to the group comprising:

- systematic interrogation at the time of switching said terminal on and/or off;
- periodic interrogation;
- interrogation following at least one particular action on said terminal;
- interrogation in a particular state of said terminal.

In some embodiments, said contactless reading means and said chip use at least one of the communication techniques belonging to the group comprising:

- Bluetooth technology;
- RFID technology.

According to particular embodiments, said contactless reading means are able to communicate with chips equipping electronic payment media. The solution according to an exemplary aspect of the disclosure thus offers the advantage of being able to use the same contactless reader of said terminal to communicate with said chip and to communicate with other chips equipping electronic payment media.

In another aspect of the disclosure, said terminal comprises internal or external means such as a memory, a USB key, a compact disk or an external hard disk, for storing at least one reference and/or one identifier of said removable battery.

In another embodiment, said terminal can thus record at least one item of information representing non-conformity, for example to date the detection of the non-conforming battery and/or to keep track of at least one parameter supplied by the chip and thus absolve the manufacturer from any responsibility in the event of subsequent malfunctioning.

At least one of the items of information recorded may also be linked to the functioning or state of the terminal itself, for example in order to have available a history of the last transactions performed in the event of a mishap.

The technologies used for implementing one or more aspects of the disclosure, such as for example Bluetooth or RFID technologies, offer the advantage of allowing the production of chips at less cost and therefore without any constraint regarding re-use.

In certain advantageous embodiments, said chip is fixed so as to prevent the functioning of said chip in the event of removal and/or attempt at removal. This solution then prevents the cloning or re-use of the chip for the purpose of equipping counterfeit equipment.

It is thus possible for example to place the chips at the core of batteries melted in a special plastic.

An aspect of the disclosure also concerns a method for checking the conformity of at least one removable battery in a portable electronic payment terminal, said removable battery carrying an electronic chip containing at least one item of identification information and being able to communicate with contactless reading means present in the said terminal.

According to an aspect of the disclosure, said method comprises the following steps:

- sending an interrogation message to said chip;
- receiving a response from said chip containing said identification information;
- deciding on the conformity of said removable battery according to said response from said chip, comprising:
  - a substep of transmitting said identification information to a distant control server of the manufacturer of the terminal;
  - a substep of receiving from said server conformity or non-conformity information according to whether said identification information belongs to a list approved by said manufacturer;
- reaction by said terminal in the case of detection of non-conformity of said battery.

Thus the method checks on the conformity of at least one removable battery in a portable electronic payment terminal, reliably and taking account of information that may be updated regularly in the server.

In some embodiments, the method provides for said response from said chip to comprise at least one identification code for said removable battery. Thus said response will make it possible in particular to authenticate said removable battery.

In a particular embodiment (compatible with the previous embodiment), said response from said chip also comprises at least one item of information on a state of functioning and/or a parameter of said removable battery.

It may be a case, for example, of its autonomy, its charging time, its discharge cycle, its electrical characteristics or any other characteristic that may influence the functioning of said terminal.

In particular embodiments, said conformity decision step comprises a check on identification information supplied by said chip with a distant control server.

For example, the terminal then checks the validity of the identification information supplied by accessing a website of the manufacturer, which delivers to it conformity or non-conformity information according to whether said identification information belongs to a list approved by said manufacturer. In addition, the terminal may check on the compatibility of the battery according to an operating characteristic received from the chip.

According to an exemplary aspect of the disclosure, said conformity verification method provides a step of reaction by said terminal in the event of detection of non-conformity of said removable battery.

As detailed above, said step of reaction by said terminal comprises the implementation of at least one action belonging to the group comprising:

- blocking of said terminal;
- sending of an alert message;
- recording by said terminal of at least one item of information representing non-conformity.

Finally, an aspect of the disclosure concerns a computer program product that can be downloaded from a communication network and/or recorded on a medium that can be read by computer and/or executed by a processor, comprising program code instructions for implementing the method for checking conformity of at least one removable battery in an electronic payment terminal described previously.

BRIEF DESCRIPTION OF THE DRAWINGS

Other characteristics and advantages will emerge more clearly from a reading of the following description of an embodiment given by way of simple illustrative and non-limitative example, and the accompanying drawings, among which:

FIG. 2 illustrates the dynamic functioning of the terminal based on the static block diagram in FIG. 1.

DETAILED DESCRIPTION OF ILLUSTRATIVE EMBODIMENTS

1. General Principle

Figure 1:
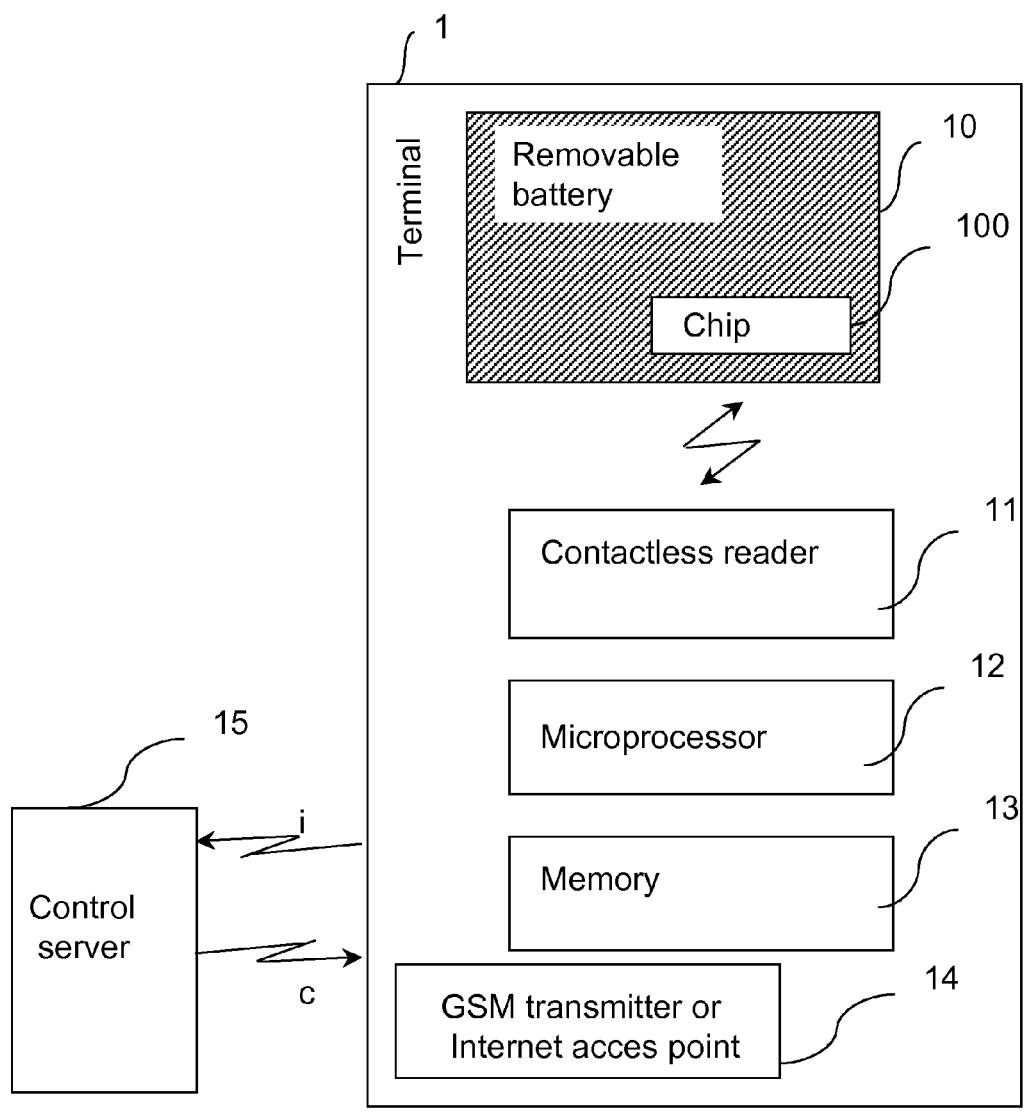
FIG. 1 presents a static block diagram of an electronic payment terminal in one embodiment.

An aspect of the disclosure concerns the checking of the conformity of at least one removable battery in a portable electronic payment terminal. This battery carries, according to an aspect of the disclosure, an electronic chip able to communicate without contact, as soon as it is inserted in said terminal and/or during use thereof, using the contactless reading means of the terminal.

The information transmitted by the chip is then communicated to a distant server, which consequently informs the terminal about the conformity of the battery. Thus it is not the terminal that decides by itself to accept the battery or not. Conformity, and therefore acceptability, is delivered by a distant server, holding updated data on the conforming batteries.

It is possible in this way to prevent or limit the use of a non-conforming battery that might reduce the reliability of the terminal, which is not compatible with the sensitive character of the type of transaction involved. Conformity is however not decided on once and for all (for example by recording acceptable references at the time of the manufacture of the terminal). On the contrary, conformity is checked with a server that can be updated regularly.

Thus it is possible to declare conforming batteries whose references did not exist at the time of manufacture of the terminal, for example because they implement new technology (the conformity of which has been tested with respect to the terminal) and/or because they are manufactured by a new approved supplier. This approach also makes it possible to declare that batteries that were previously accepted are non-conforming, for example because a fault or risk has been identified.

The approach disclosed herein also makes it possible, in some embodiments, to check expiry dates, preventing the use of batteries whose expiry date has passed.

2. Description of a Particular Embodiment

An example of an implementation applied to a mobile electronic payment terminal is considered hereinafter for the purpose of detecting, and where applicable preventing, the use of a non-conforming removable battery.

A particular embodiment of a mobile electronic payment terminal 1 according to an aspect of the disclosure is presented in relation to FIG. 1. This terminal 1 comprises a central processing and control unit (microprocessor 12) able to process data, and cooperating with a memory 13, able in particular to store at least one item of information corresponding to an identification characteristic of the battery chip.

The terminal 1 also comprises a contactless reader 11 able to communicate by radio frequency with RFID (Radio Frequency IDentification) chips. This contactless reader 11 is, in the present embodiment, intended mainly to communicate with electronic payment media, or cards, equipped with RFID chips.

Finally, in order to function, the terminal must be equipped with a removable battery 10.

In the method according to an aspect of the disclosure, the battery 10 used contains a chip 100, able to store and send data (relating to the identification of the battery and/or its functioning). In the particular embodiment described here, it is an RFID chip.

In another embodiment, the communication means of the chip 100 and contactless reader 11 may use another technology, for example Bluetooth technology.

This chip 100 is preferably made inaccessible, inside the battery (in which it can for example be embedded) or its cladding, so as to prevent attempts to recover chips in order to associate them with non-conforming batteries.

Provision can also be made for the chip to comprise means for self-destruction, for going into a particular state and/or sending an alert signal when it detects an attempt to separate the battery (for example by disconnection of an electrical connection with the battery).

In a particular embodiment, the terminal 1 also comprises a GSM transmitter or an access point 14 to an internet type network. It is thus able to communicate with communication equipment of the terminal manufacturer, such as the control server 15 of the manufacturer, in order to ensure conformity of the battery, by supplying to it identification information (I) on the battery and receiving in return conformity information (C), and/or warning it about the possibility of counterfeiting.

In another particular embodiment, alternative or complementary, the terminal 1 may comprise a means for sending an alert to a user. This sending means may be various: for example, it may in particular be a voice synthesis means, a display, a ticket printing means, or an alert by SMS or MMS.

It should be noted that the frequencies used, according to an exemplary aspect of the disclosure, by the contactless reader 11 for communicating with a chip 100 are adapted to near-field communications in order to limit the geographical range of the radio communications to the equipment contained in the terminal and therefore thus to make the method suitable for not confusing the chip equipping an adjacent terminal with the one deemed to be present in its own terminal.

The main steps of an example of a method implemented in the terminal of FIG. 1 are now presented in relation to FIG. 2.

In this particular embodiment, switching on the terminal 250 causes the activation of a step 252 of interrogating the chip present on the battery. This interrogation takes place for example by sending a radio-frequency interrogation signal. This interrogation signal is sent to the chip with sufficient energy to enable it to reply to it.

The terminal then awaits a response from the battery chip. This is the step 254 of receiving a response.

The response expected by the terminal is, in this particular embodiment, the supply of a code corresponding to the type of battery to be used on this terminal. This code can be based on various standards, such as for example on the EP-96 standard.

In the case of absence of response from the chip at step 254, the reader may reiterate a certain number of times its interrogation 252 of the chip. If, after a last test 256, the reader still has no response, the microprocessor interprets this absence of response as non-conformity of the battery (step of deciding on conformity) and goes into "non-conformity detected" mode 258.

In the case of a response from the chip at step 254, the method provides a step of deciding with regard to the conformity of the battery by checking 260 of the identification code received.

The conformity decision step can comprise verification of the code received with at least one distant control server of the manufacturer in order to check that said code belongs to a list of accepted codes.

This verification comprises in particular the transmission of the identification code received (I) to a control server of the manufacturer and then the reception 262 of conformity or non-conformity information (C) from this server.

If the verification leads to diagnosing the conformity of the battery (reception of conformity information from the server) the terminal is considered then to have normal functioning 264. In the contrary case (reception of non-conformity information from the server or absence of response from the server for example), the terminal goes into "non-conformity detected" mode 258.

A battery can be considered conforming by the server if it has previously been approved or at least tested and validated, by the manager of the site (who may be the manufacturer of the terminal or a trusted third party) or declared conforming by an authorised person (conventionally the manufacturer of the terminal). Thus the batteries considered to be conforming may change over time without being necessary to reprogram the terminal. It is the server that decides on conformity and that may in particular, according to the embodiment:

- declare a new battery conforming (new technology and/or new supplier for example);
- declare non-conforming a previously conforming battery;
- declare a battery conforming or non-conforming according to:
  - an expiry date of the battery;
  - particular conditions of use or application;
  - characteristics of the terminal; and/or
  - constraints according to regulations or standards.

The step of reaction of the terminal in the event of detection of non-conformity of the battery ("non-conformity detected" 258) depends on the particular embodiments of the method. Thus, for example, the terminal may lock up in order to avoid being damaged by a defective replacement battery. It may also generate an alert to the user or to the owner of the terminal by voice synthesis, by printing a ticket or by means of a display.

In a particular embodiment, the terminal may continue to function, where appropriate, in degraded mode. It may then on the other hand record at least one particular item of information. For example, it may record the date, the time or the nature of the non-conformity detected or the last transactions made in order to be able to have available a history in the case of abnormalities.

A period of time (or a number of specific operations) may be granted, during which the terminal functions, to allow time for the user to perform certain current or urgent operations and enable him to change the battery.

These characteristics are optional.

In a variant of the embodiment described above, the chip may be interrogated periodically, or during specific actions performed on the terminal, such as for example before each bank transaction, or when going into a particular state of the terminal such as for example a certain battery charging level, or when it is switched off.

In another variant embodiment, the conformity decision may also rely, in addition to the conformity information, on the reception of at least one operating characteristic of the battery, such as its charging capacity, its autonomy or one of its electrical characteristics for example, and/or a comparison thereof with an expected threshold value corresponding to a minimum value.

In this case, the server may decide on conformity not only in the light of absolute conformity information but also by checking that the battery does indeed have the characteristics expected in such a battery, that is to say by checking that it is not a defective battery, or that the characteristics of the battery suit the terminal in question (which must then supply, in addition to the battery identification code, its own identifier, or information allowing such an evaluation), to the application and/or the use of this terminal (use outdoors, maximum distance from a base, particular security constraints, compliance with a standard or law, etc).

It is in particular possible to provide that, when the chip is first detected (that is to say when the battery has just been changed, or the terminal has been reinitialised), an exchange with a data server, for example via the telephone network to which the terminal is connected, be implemented, in order to check on the origin of the battery, and where applicable to activate it.

For example, at the time of this first use, the chip delivers an identification code, which must be supplied to the server. The latter in response returns a release code, which the terminal transmits to the RFID chip. The latter then authorises use of the battery.

It is also possible to provide for this release to require, in replacement or in addition, the supply of information on the part of the owner of the terminal, for example by means of the keypad on the latter. It may for example be a question of an identifier of the terminal and/or a code supplied with the battery (on its packaging or directly on it).

An aspect of the disclosure thus enables the users to have the assurance that the terminal is provided with removable batteries that are conforming, safe and approved, which is essential for apparatus that is to manage financial transfers. It also enables the manufacturers to identify the cause of any malfunctioning of a terminal after use of a non-conforming removable battery. For this purpose, some variants of the disclosure comprise, during the step of reaction of the terminal in the event of detection of non-conformity, a substep of storing elements making it possible to characterise the non-conformity.

Liaison with the manufacturer may be maintained throughout the life of the battery, for example by telephone communication or via an internet type network. This may in particular enable the manufacturer to check the state of the battery and where necessary to recommend changing it or even to decide to send a new battery to the user.

An aspect of the disclosure makes it possible to combat counterfeits. In a variant embodiment, the terminal may thus warn the manufacturer of the terminal or a control entity that a potentially counterfeit battery has been detected.

An aspect of the disclosure thus improves the check on the conformity of a replacement removable battery.

An aspect of the disclosure, in at least one embodiment, avoids deterioration or faulty functioning of a terminal because of use of a non-conforming removable battery.

An aspect of the disclosure, according to at least one embodiment, avoids interference with sensitive transactions because of defective or non-conforming batteries.

An aspect of the disclosure provides such a technique that is simple to implement and inexpensive, at least in certain embodiments.

Finally, an aspect of the disclosure offers a solution adapted to possible use in a terminal of batteries that have newly appeared on the market, with higher performance or more economical, for example, that the model of the battery supplied initially by the manufacturer.

Although the present disclosure has been described with reference to one or more examples, workers skilled in the art will recognize that changes may be made in form and detail without departing from the scope of the disclosure and/or the appended claims.

What is claimed is:

1. A portable electronic payment terminal, provided by a manufacturer, comprising:

at least one removable battery, said removable battery carrying an electronic chip containing at least one item of identification information related to said battery;

a contactless reader present in said terminal, said contactless reader being configured to communicate with chips equipping an electronic payment card, which receives said identification information from said battery;

a transmitter, which transmits said identification information from said terminal to a control server when at least one of the events belonging to the following group occurs:

said terminal is switched on;
said terminal is switched off;
a battery is inserted in said terminal;
before a bank transaction from said terminal;
at regular intervals;

a receiver, which receives from said control server conformity information if said identification information belongs to a list of approved battery identification information updated by said manufacturer of said terminal and stored in said server;

means for blocking said terminal, if said conformity information is not received.

2. The portable electronic payment terminal according to claim 1, wherein the terminal further comprises means for generating at least one alarm, when said conformity information is not received.

3. The portable electronic payment terminal according to claim 1, wherein said contactless reader and said chip use at least one of the communication techniques belonging to the group comprising:

Bluetooth technology;
Radio Frequency Identification technology.

4. The portable electronic payment terminal according to claim 1, wherein the terminal further comprises means for storing at least one reference and/or an identifier of said removable battery.

5. Removable battery for a terminal according to claim 1, wherein said chip is fixed so as to prevent functioning of said chip in case of removal and/or an attempt at removal.

6. A method of checking conformity of at least one removable battery in a portable electronic payment terminal, provided by a manufacturer, said removable battery carrying an electronic chip containing at least one item of identification information related to said battery, and being able to communicate with a contactless reader present in said terminal, wherein said method comprises:

sending an interrogation message to said chip by said contactless reader, wherein said contactless reader is also configured to communicate with chips equipping an electronic payment card;

receiving a response from said chip containing said identification information;

deciding on conformity of said removable battery according to said response from said chip, comprising:

a substep of transmitting by said terminal said identification information to a control server when at least one of the events belonging to the following groups occurs:

said terminal is switched on;
said terminal is switched off;
a battery is inserted in said terminal;
before a bank transaction from said terminal;
at regular intervals; and a substep of receiving from said control server conformity information if said identification information belongs to a list of approved battery identification information updated by said manufacturer of said terminal and stored in said server; and blocking said terminal if said conformity information is not received.

7. The method for checking conformity according to claim 6, wherein said response of said chip comprises at least one item of information on at least one of a state of functioning or a parameter of said removable battery.

8. The method for checking conformity according to claim 6, wherein said step of blocking of said terminal comprises implementation of at least one action belonging to the group comprising:

sending an alert message;
recording by said terminal at least one item of information representing non-conformity.

9. A computer program product recorded on a medium that can be read by computer and/or executed by a processor, wherein the product comprises program code instructions for implementing a method of checking conformity of at least one removable battery in a portable electronic payment terminal, provided by a manufacturer, said removable battery carrying an electronic chip containing at least one item of identification information related to said battery and being able to communicate with a contactless reader present in said terminal, wherein said method comprises:

sending an interrogation message to said chip by said contactless reader, wherein said contactless reader is also configured to communicate with chips equipping an electronic payment card;

receiving a response from said chip containing said identification information;

deciding on conformity of said removable battery according to said response from said chip, comprising:

a substep of transmitting by said terminal said identification information to a control server when at least one of the events belonging to the following group occurs:

said terminal is switched on;
said terminal is switched off;
a battery is inserted in said terminal;
before a bank transaction from said terminal;
at regular intervals; and a substep of receiving from said control server conformity information if said identification information belongs to a list of approved battery identification information updated by said manufacturer of said terminal and stored in said server; and blocking said terminal if said conformity information is not received.

* * * * *